(12) United States Patent
Harrington

(10) Patent No.: US 10,131,317 B1
(45) Date of Patent: Nov. 20, 2018

(54) HEAD SUPPORT AND SAFETY HARNESS SYSTEM

(71) Applicant: Kendall Harrington, Levittown, NY (US)

(72) Inventor: Kendall Harrington, Levittown, NY (US)

( * ) Notice: Subject to any disclaimer, the term of this patent is extended or adjusted under 35 U.S.C. 154(b) by 201 days.

(21) Appl. No.: 15/074,855

(22) Filed: Mar. 18, 2016

(51) Int. Cl.
| | |
|---|---|
| *B60R 22/10* | (2006.01) |
| *B60N 2/26* | (2006.01) |
| *B60N 2/28* | (2006.01) |
| *B60R 22/00* | (2006.01) |
| *B60R 22/12* | (2006.01) |

(52) U.S. Cl.
CPC ............ *B60R 22/001* (2013.01); *B60N 2/265* (2013.01); *B60N 2/2851* (2013.01); *B60R 22/105* (2013.01); *B60R 22/12* (2013.01)

(58) Field of Classification Search
CPC . B60R 22/00; B60R 2022/008; B60R 22/024; B60R 22/14; B60R 22/28; B60R 2021/0044; B60N 2002/4405; B60N 2/265; B60N 2/2851
USPC ......................................... 297/483, 484, 485
See application file for complete search history.

(56) References Cited

U.S. PATENT DOCUMENTS

| | | | | |
|---|---|---|---|---|
| 3,992,028 A | * | 11/1976 | Abe | B60N 2/002 180/274 |
| RE29,841 E | | 11/1978 | Wener | |
| 5,299,855 A | | 4/1994 | Zubeck | |
| 5,468,020 A | * | 11/1995 | Scime | B60N 2/2803 280/801.1 |
| 5,527,094 A | | 6/1996 | Hiramatsu et al. | |
| 6,305,749 B1 | * | 10/2001 | O'Connor | A47C 7/383 297/397 |
| 6,338,529 B1 | | 1/2002 | David et al. | |
| 6,547,333 B2 | * | 4/2003 | Parenteau | B60N 2/2851 297/397 |
| 6,796,584 B1 | | 9/2004 | Hernandez | |
| 7,300,113 B2 | * | 11/2007 | Baloga | B60N 2/2803 297/250.1 |
| 7,380,877 B2 | * | 6/2008 | Konig | B60N 2/2806 297/185 |
| 7,618,097 B2 | | 11/2009 | Ghatge | |
| 7,699,402 B2 | * | 4/2010 | DeLellis | B60R 22/02 297/467 |
| 7,770,969 B2 | * | 8/2010 | Boyle | B60N 2/2806 297/254 |
| 7,798,527 B2 | * | 9/2010 | Walton | B60N 2/242 280/801.1 |
| 8,007,046 B2 | * | 8/2011 | Rothschild | B64D 11/062 297/465 |

(Continued)

*Primary Examiner* — Timothy J Brindley
(74) *Attorney, Agent, or Firm* — Edwin D. Schindler

(57) ABSTRACT

An easily portable safety harness and head support system for a vehicle is disclosed. The apparatus includes clips that attach to the headrest posts of the existing vehicle seat and the brackets on the seat back. A head support portion including a neck cushion and two side cushions is included and front harness straps with a release secure the child or toddler. The vehicle seat belt fits between the doubled strap harnesses that extend from the headrest posts to the bottom of the seat back, preventing the child or toddler from being ejected from the vehicle in the case of a collision or the like. The head support portion with the neck cushion and side supports prevents neck injuries.

11 Claims, 15 Drawing Sheets

(56) References Cited

U.S. PATENT DOCUMENTS

| | | | |
|---|---|---|---|
| 8,251,457 B2 * | 8/2012 | Britton | B60N 2/2806 297/219.1 |
| 8,752,895 B2 | 6/2014 | Fritz et al. | |
| 8,794,709 B2 * | 8/2014 | Kennedy | B60R 22/10 297/465 |
| 8,960,804 B2 * | 2/2015 | Knight | B60N 2/2803 297/250.1 |
| 8,974,005 B2 * | 3/2015 | Mason | B60N 2/2812 24/614 |
| 8,979,197 B2 | 3/2015 | Cheng et al. | |
| 9,114,739 B2 | 8/2015 | Conway | |
| 9,238,424 B1 * | 1/2016 | Foster | B60N 2/265 |
| 9,376,088 B2 * | 6/2016 | Sumroy | B60R 22/105 |
| 9,845,030 B2 * | 12/2017 | Palma | B60N 2/4879 |
| 2016/0031351 A1 * | 2/2016 | Galbreath | B60N 2/64 297/284.1 |

* cited by examiner

HEAD SUPPORT AND SAFETY HARNESS SYSTEM

BACKGROUND OF THE INVENTION

Field of the Invention

The present invention relates generally to vehicle passenger restraint systems and more specifically to a restraint system for a vehicle seat that allows the user to secure a toddler or smaller child into an existing seat to support and restrain the child's head movement while sleeping and to protect the child from "whiplash" or other violent movements of the neck and head during a collision.

Description of the Prior Art

There are other vehicular restraint systems which provide for protection during collisions or evasive maneuvering. While these restraints may be suitable for the purposes for which they were designed, they would not be as suitable for the purposes of the present invention as heretofore described.

It is thus desirable to provide a restraint system for a child or toddler that protects the neck and head of the child from violent inadvertent movement in case of a collision or the like, especially while sleeping.

It is further desirable to have a vehicular restraint system that may be used in combination with a booster seat and/or the vehicle's existing seat belts for the purpose of supporting and restraining a child's torso in an upright position and providing tiered neck and head cushion support allowing the child to sleep by laterally supporting the neck and head.

SUMMARY OF THE PRESENT INVENTION

A primary object of the present invention is to provide a head support and safety harness system for a vehicle that can restrain a sleeping child's head movement and mitigate discomfort caused by the child sleeping with their head against the car door or seat belt pressing into their neck and injury due to vehicle malfunction or accident while their head is cantilevered to their torso.

Another object of the present invention is to provide a head support and safety harness system comprising vehicle seat anchor, head rest and torso harness for securing a child into an existing seat in the vehicle.

Yet another object of the present invention is to provide a head support and safety harness system wherein said vehicle seat anchor provides a pair of enablements for securing the vehicle seat anchor between a vehicle's LATCH anchors and either the vehicle's provided top tether requiring a single top end anchor strap or vehicle's head rest posts requiring two anchor straps for securing to a respective head rest post.

Yet another object of the present invention is to provide a head support and safety harness system having anchor straps slides incorporating fastener for releasably securing the anchor straps to the vehicle's LATCH anchors and to the vehicle's top tether or vehicle's head rest posts.

Yet another object of the present invention is to provide a head support and safety harness system wherein said anchor straps are tensioned through said strap slides forming a tensioned overlaying double strap whereby an existing seat belt can be feed through the double strap then latched thereby further securing the vehicle seat anchor to the vehicle seat.

Another object of the present invention is to provide a head support and safety harness system having anchor straps optionally providing a lap belt with latchable portions fixedly attached to a respective left and right anchor strap.

Another object of the present invention is to provide a head support and safety harness system wherein said vehicle seat anchor further provides spaced apart top end and bottom end loops for securing a respective left and right torso harness strap thereto.

Yet another object of the present invention is to provide a head support and safety harness system with a harness latching fastener comprising left and right latching members secured to a respective torso harness strap with said latching fastener slide able along the torso harness strap.

Another object of the present invention is to provide a head support and safety harness system wherein said head rest is releasably attachable to the vehicle seat anchor pliable panel through mechanical fastener, such as hook and loop, zipper, snaps, etc.

Another object of the present invention is to provide a head support and safety harness system wherein said head rest comprises a back cushion portion upwardly extending into a head and neck support portion.

Another object of the present invention is to provide a head support and safety harness system wherein said head and neck support portion provides an interior support structure comprising angled polymeric core plate encased by a polymeric flexible rib portion enclosed by foam board having tiered neck and head cushion fastened thereto with the head cushion recessed relative to the peripheral edge of the neck cushion with the head and neck portion having a zipped covering.

Additional objects of the present invention will appear as the description proceeds.

The present invention overcomes the shortcomings of the prior art by providing an easily carried and attached support system that secures a child or toddler into an existing seat in a vehicle and provides head and neck protection for the child without the necessity of securing a bulky and inconvenient "child car seat" onto an already existing seat.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

Figure 9A:
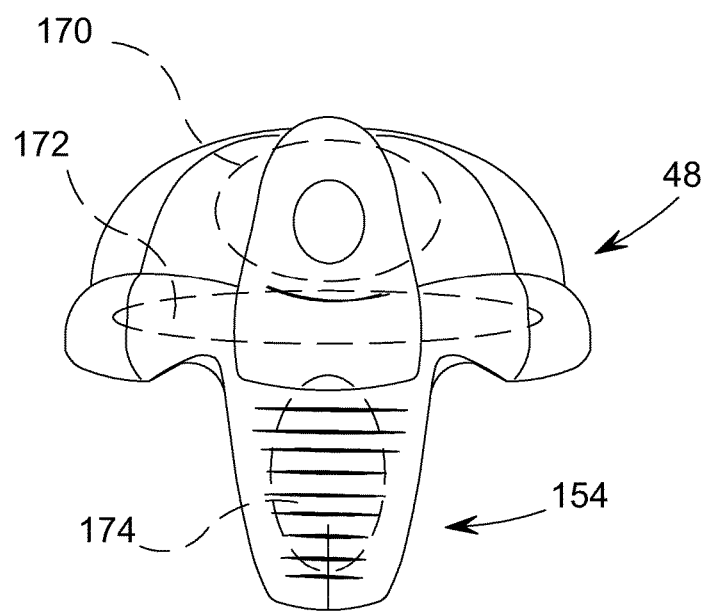
FIG. 9A is an illustrative view of the head and neck support.
Figure 9B:
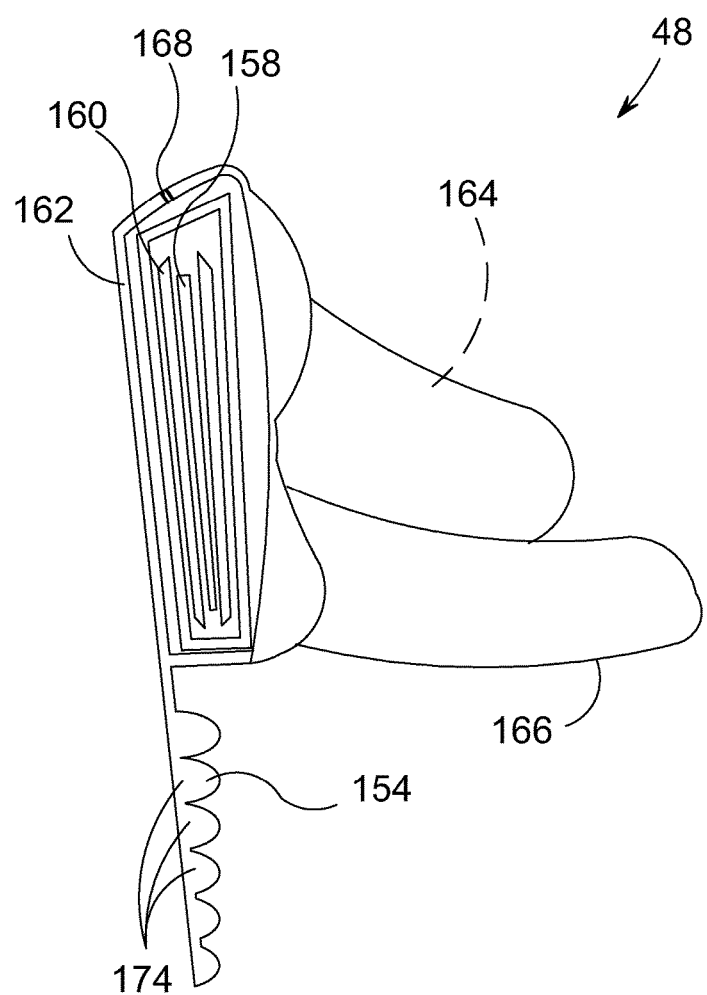

FIG. 9B a sectional view of an enablement of the head and neck support with integral back support cushion.

Figure 10A:
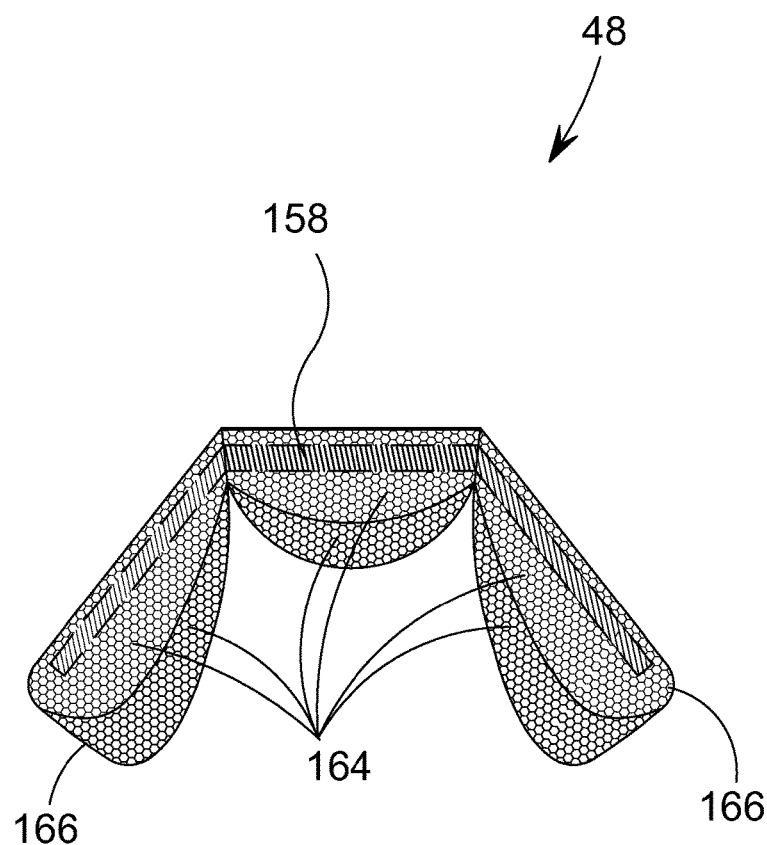

FIG. 10A is a top partial sectional view of the head and neck support.

Figure 10B:
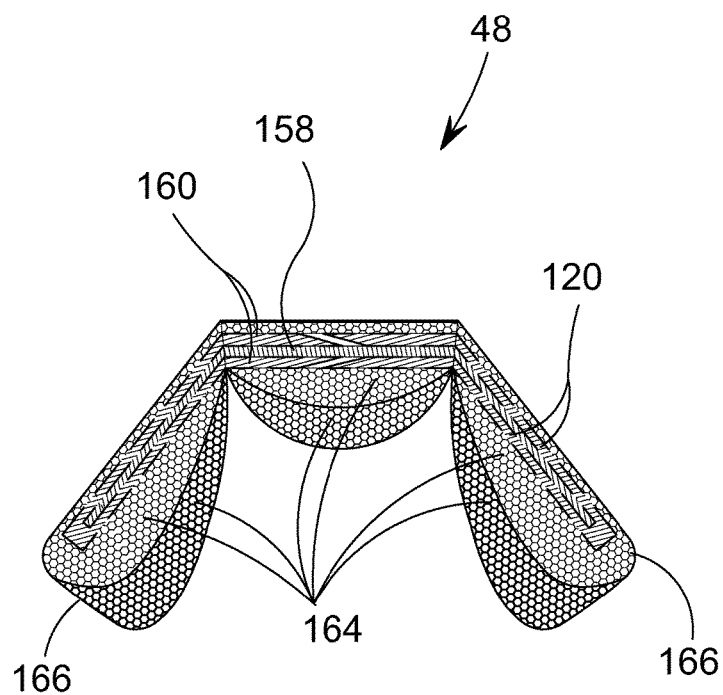

FIG. 10B is another top partial sectional view of the head and neck support.

Figure 10C:
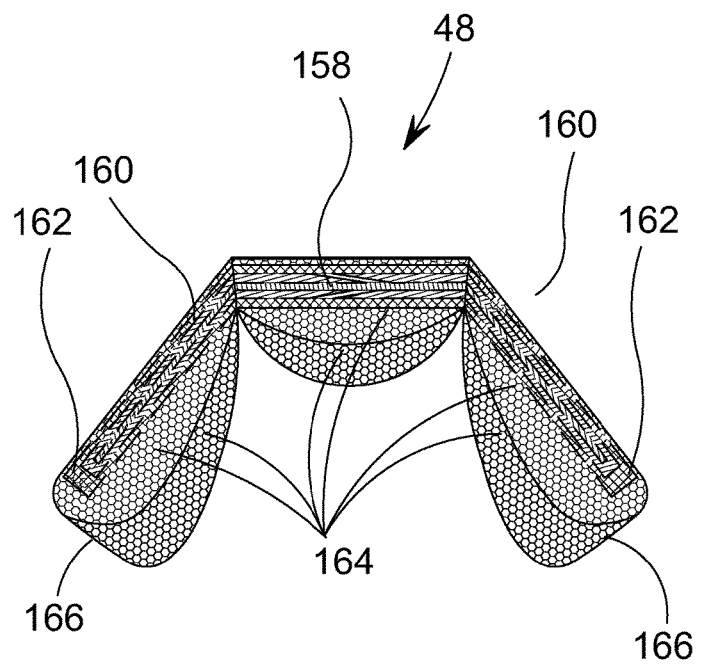

FIG. 10C is an additional top partial sectional view of the head and neck support.

Figure 11:
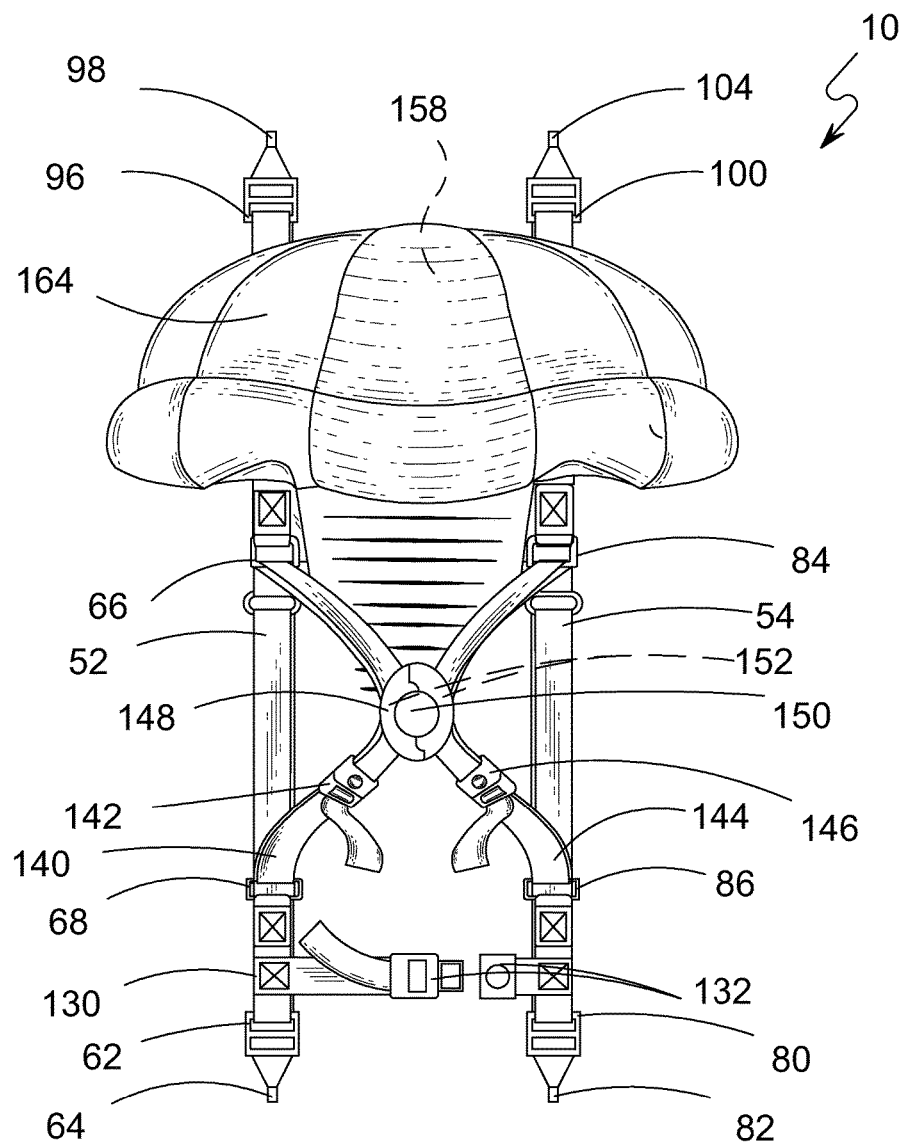

FIG. 11 is an illustrative assembled view of an embodiment of the head support and safety harness f the present invention.

Figure 12:
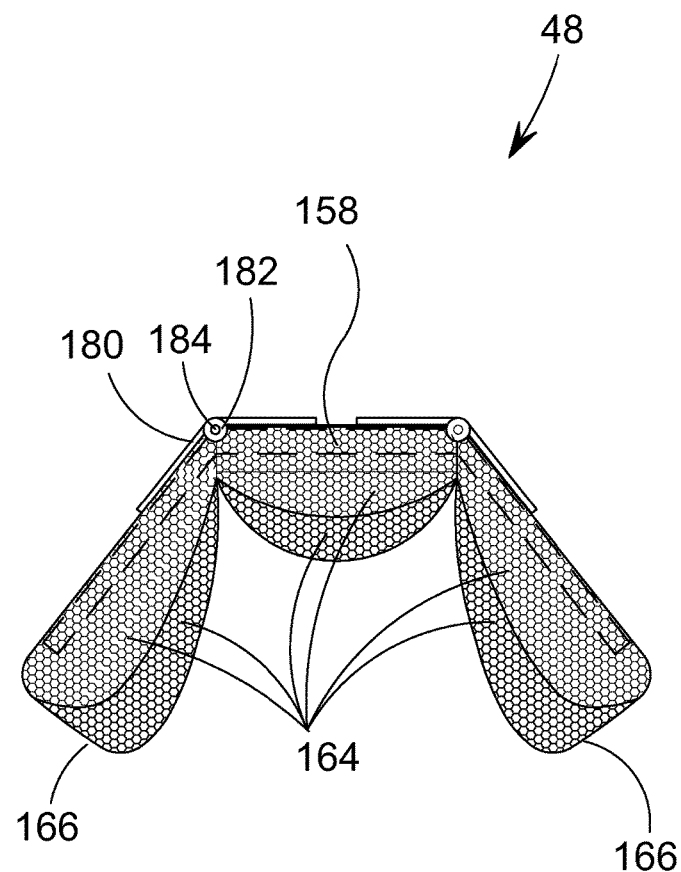

FIG. 12 is an illustrative view of the head support and safety harness incorporating a hinge.

DESCRIPTION OF THE REFERENCED NUMERALS

Turning now descriptively to the drawings, in which similar reference characters denote similar elements throughout the several views, the figures illustrate the use of the present invention. With regard to the reference numerals used, the following numbering is used throughout the various drawing figures.

10 head support and safety harness of the present invention
12 existing vehicle seat
14 seat belt of 12
16 latch of 14
18 LATCH anchor of 12
20 top tether anchor of 12
22 head rest of 12
24 post of 22
30 Child
32 head of 30
34 neck of 30
36 torso of 30
38 shoulders of 30
40 vehicle seat anchor of 10
42 bottom anchor portion of 40
44 headrest post top anchor portion of 40
46 top tether top anchor portion of 40
48 head support of 10
50 torso harness of 10
52 first strap of 42
54 second strap of 42
56 anchor sheet of 42
62 bottom strap slide 50
64 fastener of 62
66 top end loop of 50
68 bottom end loop of 50
74 ring loop of 50
80 bottom strap slide 52
82 fastener of 80
84 top end loop of 52
86 bottom end loop of 52
92 ring loop of 52
94 first strap of 44
96 strap slide of 94
98 first fastener of 44
100 second strap of 44
102 strap slide of 100
104 second fastener of 44
110 top tether anchor strap of 46
112 strap slide of 110
114 fastener of 46
116 connector sheet of 46
118 first strap of 46
120 strap slide of 118
124 second strap of 46
126 strap slide of 124
130 lap belt
132 lap belt latch
140 first torso harness strap of 50
142 buckle of 140
144 second torso harness strap
146 buckle of 144
148 torso harness latch of 50
150 torso harness latch release of 50
152 belt slides of 148
154 back support cushion
158 core plate
160 flexible rib
162 foam board
164 neck and head cushion
166 covering
168 closure of 126
170 reinforced headrest
172 neck support cushion brace
174 foam roles lined with microfiber cloth
180 hinge
182 ratchet
184 rail post

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
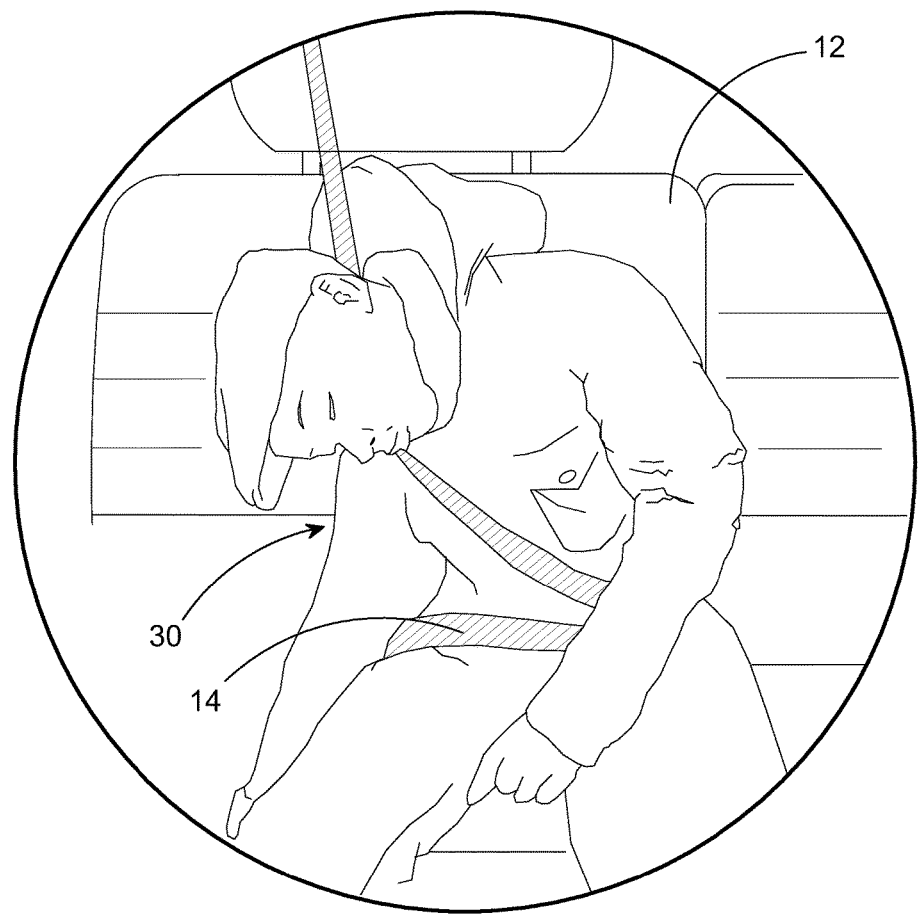
FIG. 1 is a child or toddler secured in the rear seat of a vehicle in the standard fashion.

Referring to FIG. 1, shown is a child or toddler 30 secured in the rear seat 12 of a vehicle in the standard fashion. The seat belt 14 is secured about the child 30. Note that here, in the prior art, the child 30 is at risk in that there is no head or neck support in the case of a collision or sudden deceleration and that additionally the seat belt 14 itself poses a choking risk due to the diminutive size of the child or toddler 30 and the fact that the child has slumped over in the seat 12 while sleeping.

Figure 2:
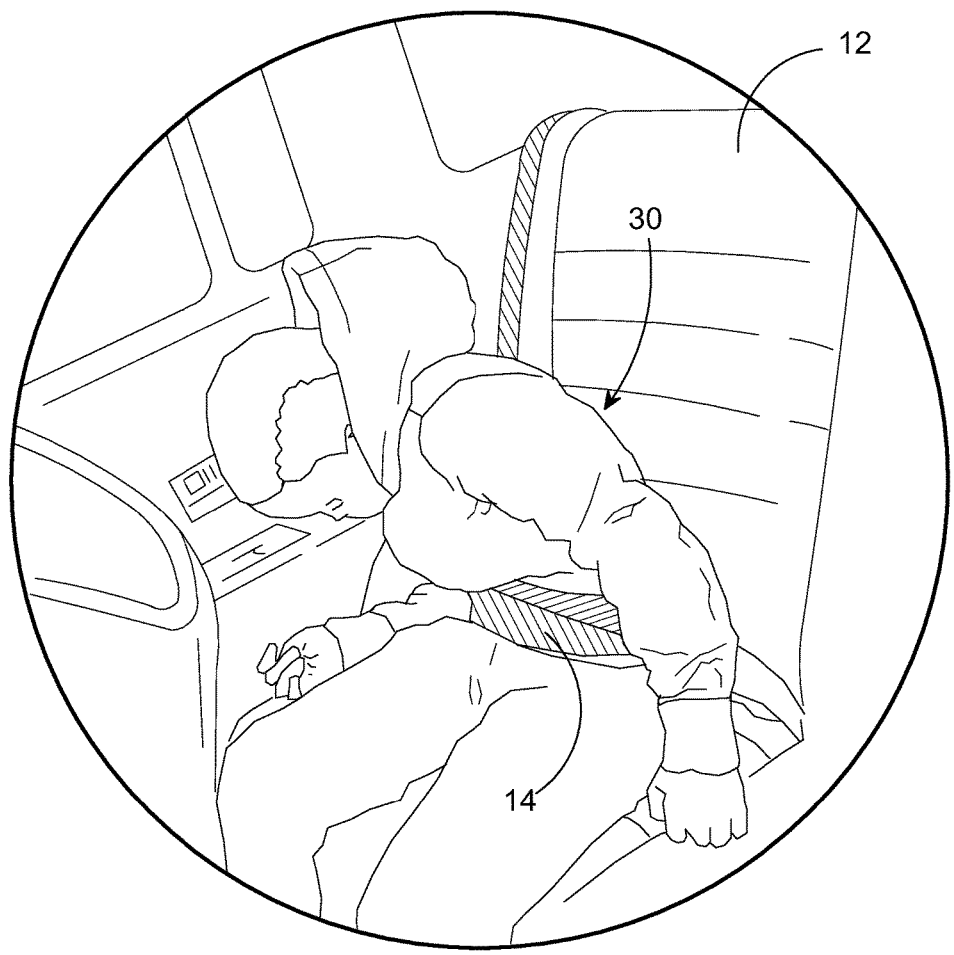
FIG. 2 is another illustrative view of the disadvantages of the prior art.

Referring to FIG. 2, shown is another illustrative view of the disadvantages of the prior art. The child 30 is again shown slumped over while sleeping in the car and in case of a collision or radical driving maneuver, injury could easily occur.

Figure 3:
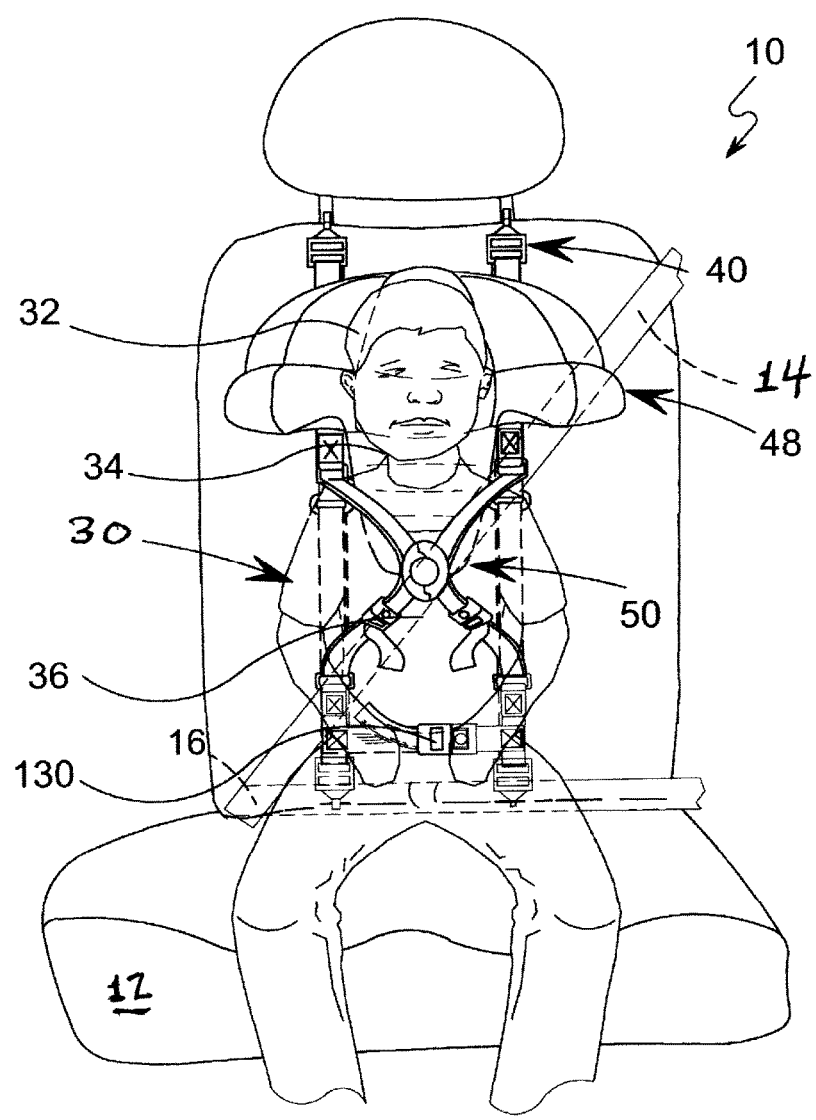
FIG. 3 is the present invention in use.

Referring to FIG. 3, shown is the present invention in use. The present invention is indicated generally at 10 and is seen securing the child or toddler 30 into the seat 12 of the vehicle. As will be discussed further below, the support system and safety harness 10 engages the seat belt 14 and includes a vehicle seat anchor 40 mountable to seat 12 with head and neck support 48 providing support to the child's head 32 and neck 34 while sleeping or during an accident. Also shown is child harness 50 secured to vehicle seat anchor 40 for restraining torso 36 movement Also seen in the Figure are the first and second double strap harnesses indicated at 16 and 18, respectively.

Figure 4:
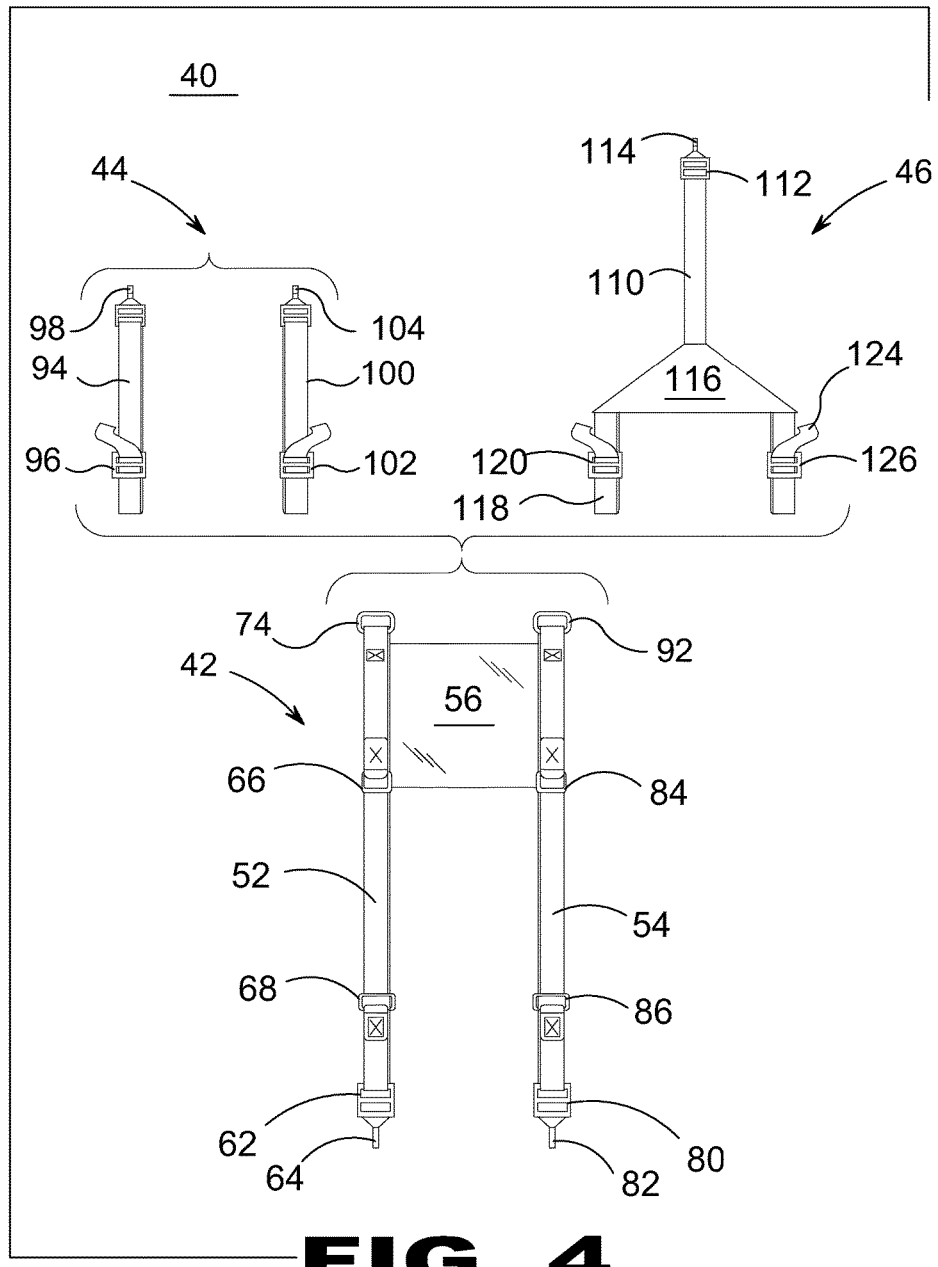
FIG. 4 is the vehicle seat anchor comprising a bottom anchor portion and a top anchor portion.

Referring to FIG. 4, shown is the vehicle seat anchor comprising a bottom anchor portion and a top anchor portion. The invention envision a need for a vehicle seat anchor 40 having bottom anchor portion 42 and a top anchor portion 44 fastenable to headrest 22 posts 24 and/or a top anchor portion 46 fastenable to top tether anchor 20 with both top anchor portions 44, 46 providing straps 94, 100 and 118, 126 respectively securable to bottom anchor portion 42 ring loop 74 and ring loop 92. The bottom anchor portion 42 provides straps 52, 54 having anchor sheet 56 fastened therebetween with each strap length adjustable through bottom strap slides 62, 80 each having respective fasteners 64, 82 fastenable to the provided vehicle seat LATCH anchors. Each strap further provides top end loops 66, 84 and bottom end loops 68, 86 form attachment loops for the torso harness. As aforementioned, bottom anchor portion 42 provides loops 74, 92 for attachment of a top anchor portion. The invention provides for a top anchor portion 44 having a pair of straps 94, 100 having respective strap slides 96, 102 for varying the strap length with distal end fasteners 98, 104 fastenable to a respective headrest 22 posts 24. Also provided is a top anchor portion 46 having a pair of straps 118, 124 having respective strap slides 120, 126 for varying the strap length with the straps fixedly attached to pliable sheet 116 having distal end strap 110 terminating in strap slide 112 and fastener 114 for securing the upper strap portion 46 to the top tether anchor 20.

Figures 5A, 5B:
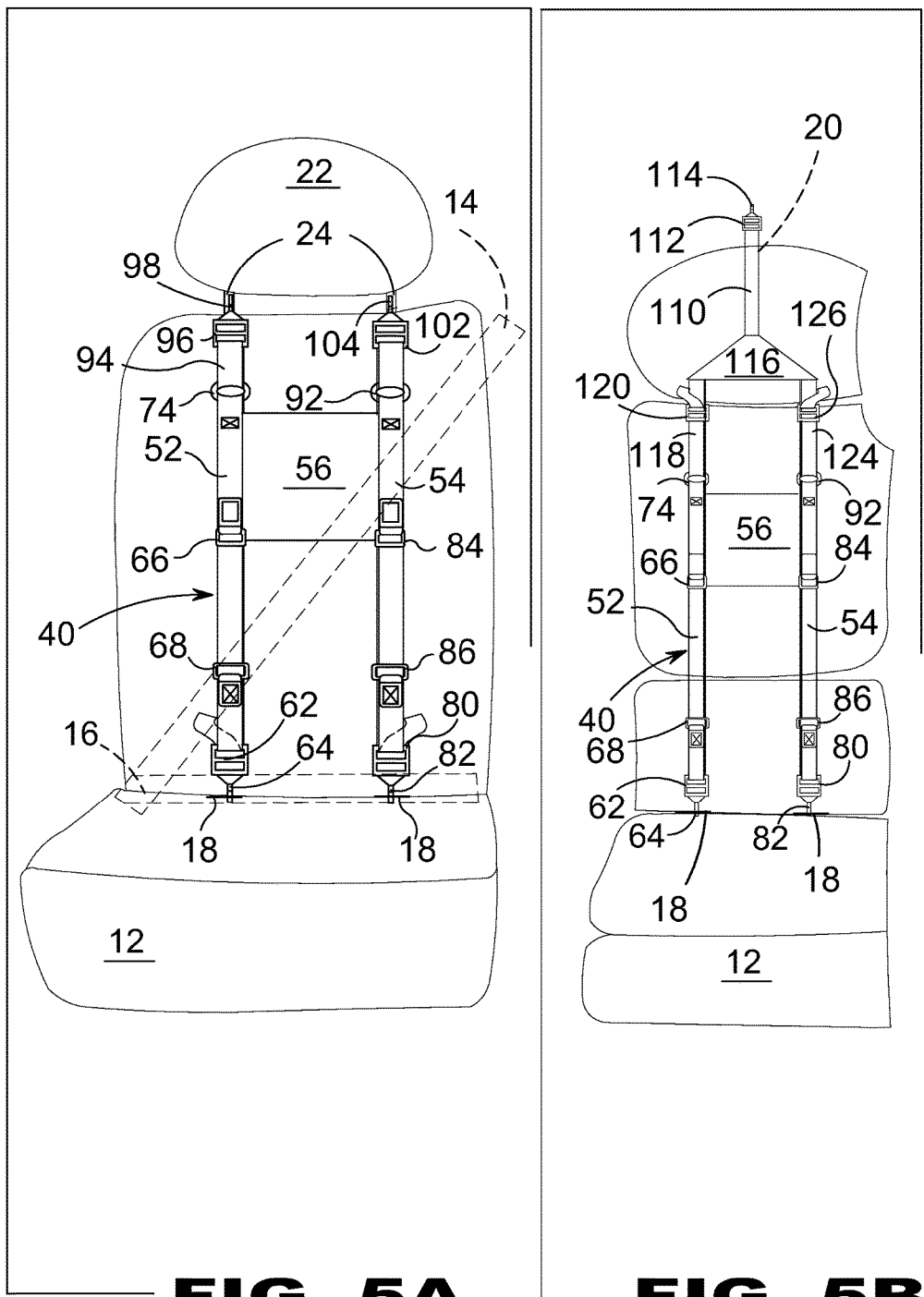
FIG. 5A is an illustrative view of the vehicle seat anchor in use.
FIG. 5B is another illustrative view of the vehicle seat anchor in use.

Referring to FIGS. 5A and 5B, shown are illustrative views of the vehicle seat anchors in use. FIG. 5A shows vehicle seat 12 having posts 64 of headrest 22 and LATCH anchors 18 with headrest post top anchor portion 44 and conjoined bottom anchor portion 42 releasably attached therebetween. The head support and safety harness 10 incorporates several belts as means of securement to a vehicle seat 12. The belts providing anchor for the head and neck pillow support portion 48 and the torso harness portion 50 comprise a bottom anchor portion 42 and a top anchor portion 44. Head and neck pillow portion 48 is releasably attached to anchor sheet 56 through mating fasteners respectively located on anchor sheet 56 and pillow portion 48, such as hook and loop, zipper, snaps, buttons, etc. with the intent of being able to disassemble the head support and safety harness 10 for machine washing. The neck pillow portion 48 cover 166 incorporates closure 168, such as, zipper, button, snaps, hook and loop for removal of the foam cushion prior to machine washing. Certainly, the foam cushion can be machine washed but takes many hours at low heat to dry or a day or two if hung out to dry. It would be more cost effective and hygienic to use a microfiber that can be easily washed as desired to remove, microorganisms, pollen, and dirt. FIG. 5B shows vehicle seat 12 having top tether anchor 20 and anchors 18 as components of the LATCH system. The present invention provides bottom anchor portion 42 fastenable to LATCH members 18 through fasteners 64, 82 and top tether top anchor portion 46 fastenable to LATCH member 20 through fastener 114. Straps 118, 124 and slides 120, 126 secure top tether top anchor portion 46 through ring loops 74, 92 to bottom anchor portion 40.

Figure 6:
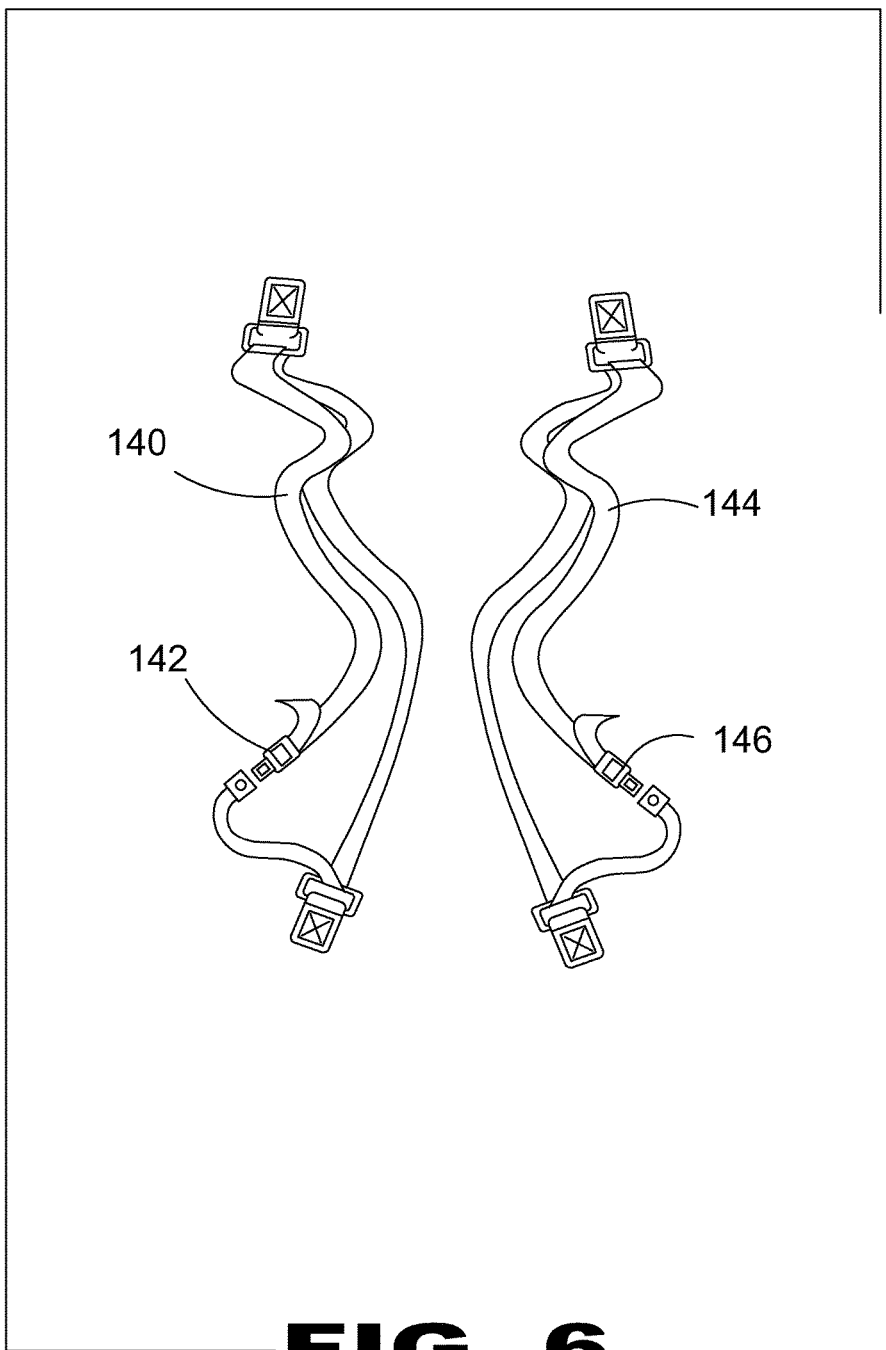
FIG. 6 is an illustrative view of a pair of straps attachable to the vehicle seat anchor forming child torso harness.

Referring to FIG. 6, shown is a pair of straps attachable to the vehicle seat anchor forming child torso harness. Illustrated are straps 140 and 144 that are fed through anchor strap loops, adjusted to the appropriate length and latched through buckles 142 and 146.

Figure 7:
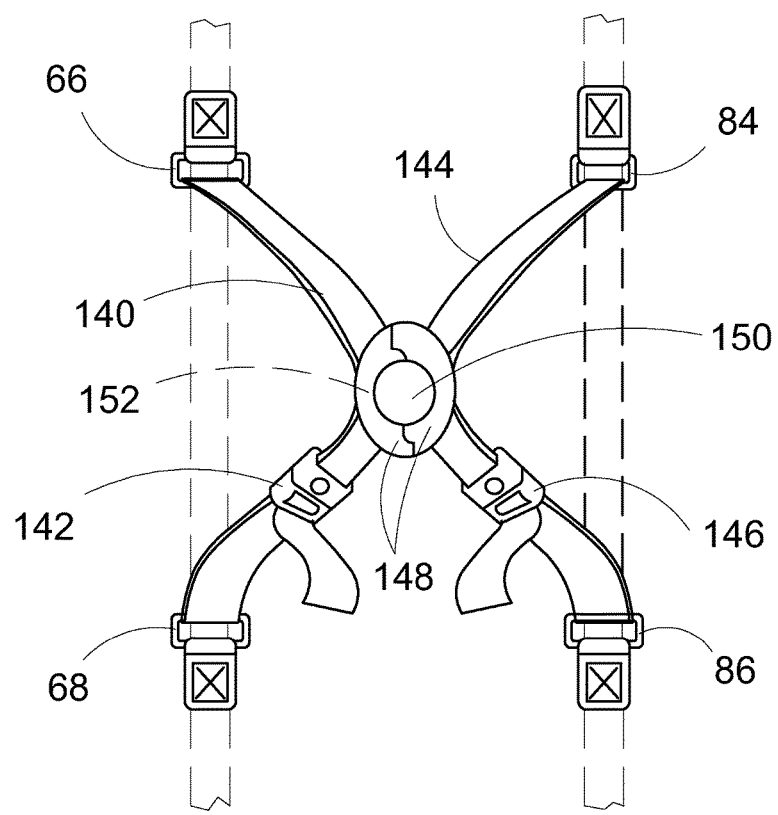
FIG. 7 is the safety harness operatively attached to the vehicle seat anchor through provided anchor belt loops.

Referring to FIG. 7, shown is the safety harness operatively attached to the vehicle seat anchor through provided anchor belt loops. Illustrated is the torso harness 50 comprising belts 140 and 146 fed respectively through loops 66, 68 and torso harness latch 148 slides 152 then latched through buckles 142, 146. Torso harness latch 148 is vertically adjustable by virtue of both belts feeding through respective belt slides 152.

Figure 8:
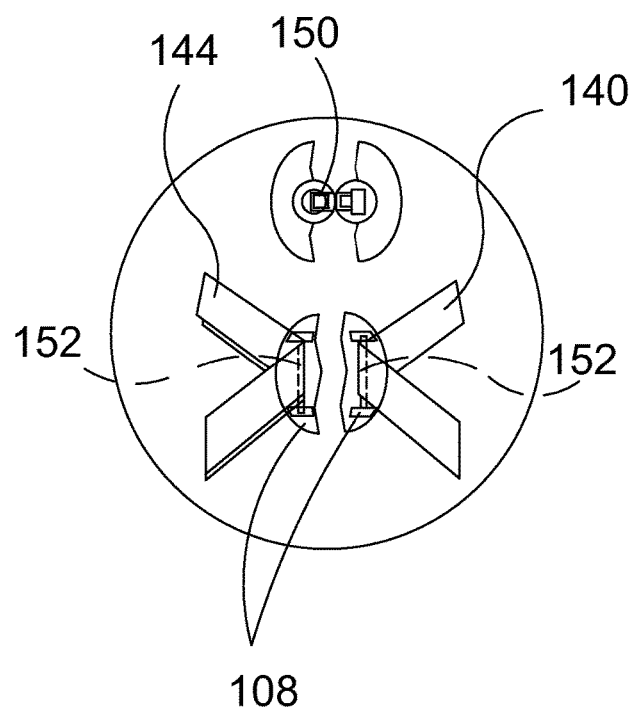
FIG. 8 is an illustrative view of the back side of the torso harness latch in the open position.

Referring to FIG. 8, shown is an illustrative view of the back side of the torso harness latch in the open position. Depicted is torso harness latch 148 having belt slides 152 with belts 144 and 140 fed through a respective latch portion 148. Also shown is torso latch release 150.

Referring to FIG. 9A, shown is an illustrative view of the head and neck support. The head and neck support 48 is the nexus of the present invention by providing a cushion for a child's head. Many children are lulled to sleep while traveling in vehicles whether through monotony or vehicle/road noise where then seal belt 12 lies against the child's neck while sleeping or the child moves the chest belt to the rear and sleeps with their head against the door, as shown in Figures one and two that are illustrations of the pictures taken by the inventor of their children sleeping while on a road trip. In both states the children are in danger of harm should the vehicle become involved in an accident, in the best case, it is just really uncomfortable to sleep with a belt against one's head. Therefore, the present invention provides head and neck support 48 having an integral back support cushion 154 formed of foam rolls lined with microfiber cloth 174 and reinforced headrest 170.

Referring to FIG. 9B, shown is a sectional view of an enablement of the head and neck support with integral back support cushion. As aforementioned, the present invention provides a vehicle seat attachable head and neck pillow support portion 48 and a torso harness portion 50 fixedly and releasably attached to vehicle seat 12 using vehicle seat anchor 40. The premise being to keep child 30 in a substantially torso 36 erect position using the torso harness 50 and to support the child's head and neck 32, 34 while traveling. Should the child fall asleep, the head and neck pillow 48 will support the head 32 in a more natural and comfortable position. The present invention provides the head and neck support 48 with interior support comprising at least a core plate 158 and optionally a flexible rib section 160 and optionally foam board 162. Also shown is back support cushion 154 having foam rolls lined with microfiber cloth 174. structural members and neck and head cushion 164 having cover 166 and closure 168, which may be zipper, hook and loop, snaps and buttons.

Referring to FIG. 10A, shown is a top partial sectional view of the head and neck support. The head and neck support 48 incorporates at least one structural support member comprising core plate 158 and neck and head cushion 164 enclosed within covering 166.

Referring to FIG. 10B, shown is a top partial sectional view of the head and neck support. The head and neck support 48 incorporates at least one structural support member comprising core plate 158 and optionally a flexible rib 160 and neck and head cushion 164 enclosed within covering 166.

Referring to FIG. 10C, shown is a top partial sectional view of the head and neck support. The head and neck support 48 incorporates at least one structural support member comprising core plate 158 and optionally flexible rib 160 and optionally foam board 162 providing structural support for neck and head cushion 164 enclosed within covering 166. It should be noted that preferably the head support portion of the neck and head cushion 164 is set back from the peripheral edge of the neck supporting portion so that the top of the pillow doesn't obstruct the child's view looking out the window but while sleeping provides support for both the head and neck.

Referring to FIG. 11, shown is an illustrative assembled view of an embodiment of the head support and safety harness 10 of the present invention provides several belts as means of securement to a vehicle seat 12. The belts providing anchor for the head and neck pillow support portion 48 and the torso harness portion 50 comprise a bottom anchor portion 42 and a top anchor portion 44. Head and neck pillow portion 48 is releasably attached to anchor sheet 56 through mating fasteners respectively located on anchor sheet 56 and pillow portion 48, such as hook and loop, zipper, snaps, buttons, etc. with the intent of being able to disassemble the head support and safety harness 10 for machine washing. The neck pillow portion 48 cover 166 incorporates closure 168, such as, zipper, button, snaps, hook and loop for removal of the foam cushion prior to machine washing. Also illustrated is the torso harness 50 comprising belts 140 and 146 fed respectively through loops 66, 68 and torso harness latch 148 slides 152 then latched through buckles 142, 146. Torso harness latch 148 is vertically adjustable by virtue of both belts feeding through respective belt slides 152. Bottom anchor portion 42 optionally provides lap seat belt 130 having lap belt latch 132.

Also shown is child harness 50 secured to vehicle seat anchor 40 for restraining child torso movement. Also seen in the Figure are the first and second double strap harnesses indicated at 16 and 18, respectively.

Referring to FIG. 12, shown is the head support and safety harness system incorporating hinges. The present invention further envisions a head and neck support 48 having left and right side hinge 180 having a post 182 and a ratchet 184 whereby the left and right pillow sections can be selectively adjusted.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A removable safety harness and head support for an existing automobile seat, wherein said automobile seat includes a headrest with headrest posts and a rear seat bracket, said removable safety harness and head support for the existing automobile seat comprising:

a pair of securement straps having a top end and a bottom end and an anchor sheet located therebetween, said each said top end of each of said securement straps further includes a clip to engage with one of the headrest posts and wherein said bottom end of each of said securement straps includes a to engage with the rear seat bracket;

harness front straps extending from said pair of securement straps, said harness front straps being located proximate a midpoint between said top end of said pair of securement straps and said bottom end of said pair of securement straps, and a harness release mechanism attached to said harness front straps and located centrally between said pair of securement straps, said harness front straps arranged in a substantially crossed-X arrangement and being of sufficient length for enclosing a child or toddler between the automobile seat and said harness release mechanism when engaged for holding the child or toddler in a secure position; and, a head support portion having two side support cushions and a central neck cushion and wherein said head support portion is releasably attached to said anchor sheet and located between said pair of securement straps, said head support portion being located between said harness front straps and said top ends of said pair of securement straps, wherein, said securement strap top ends are attached to the headrest posts of the automobile seat and said bottom ends of said pair of said securement straps are attached to the seat rear seat bracket of said automobile, said harness release mechanism being disengaged so that the child or toddler is able to be placed between said pair of securement straps with said head support portion in place for stabilizing the child or toddler's head, said harness release mechanism being engaged for holding the child or toddler in the secure position.

2. The removable safety harness and head support according to claim 1, wherein the automobile seat further includes a seat belt and said removable safety harness and said head support includes a seat belt engagement means to engage the seat belt.

3. The removable safety harness and head support according to claim 2, wherein said seat belt engagement means comprises an inner strap and an outer strap on each of said securement straps and the seat belt strap is disposed between said inner and said outer strap.

4. The removable safety harness and head support according to claim 3, wherein said bottom end of each of said securement straps further includes a length adjustment means for each of said securement straps.

5. The removable safety harness and head support according to claim 1, wherein said harness release mechanism is a spring loaded mechanism.

6. The removable safety harness and head support according to claim 5, wherein both of said clips on said top ends of said pair of securement straps include a spring loaded closing mechanism.

7. The removable safety harness and head support according to claim 6, further comprising an O-ring located on each of said pair of securement straps, said O-rings being located between said head support portion and said top ends of said pair of securement straps.

8. The removable safety harness and head support according to claim 4, wherein said bottom end of each of said securement straps includes a swivel located between said hook and said length adjustment means.

9. The removable safety harness and head support according to claim 8, wherein said harness release mechanism is a spring loaded mechanism.

10. The removable safety harness and head support according to claim 9, wherein said clips on said top ends of pair of said securement straps include a spring loaded closing mechanism.

11. The removable safety harness and head support according to claim 6, further comprising an O-ring located on each of said securement straps, said O-rings being located between said head support portion and said top ends of said pair of securement straps.

\* \* \* \* \*